(12) United States Patent
Srivastava et al.

(10) Patent No.: US 8,489,674 B2
(45) Date of Patent: Jul. 16, 2013

(54) DISTRIBUTED PUBLISH/SUBSCRIBE SYSTEM

(75) Inventors: Utkarsh Hriday Srivastava, Emeryville, CA (US); Benjamin Clay Reed, Morgan Hill, CA (US); Yang Zhang, Foster City, CA (US); Erwin Sing Tam, San Jose, CA (US); Brian Frank Cooper, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 604 days.

(21) Appl. No.: 12/722,411

(22) Filed: Mar. 11, 2010

(65) Prior Publication Data

US 2011/0225229 A1    Sep. 15, 2011

(51) Int. Cl.
*G06F 15/16* (2006.01)

(52) U.S. Cl.
USPC ........... 709/203; 709/206; 709/238; 709/225; 709/217; 707/2; 707/11

(58) Field of Classification Search
USPC ............. 709/203, 206, 238, 225, 217; 707/2, 707/101
See application file for complete search history.

(56) References Cited

U.S. PATENT DOCUMENTS 8,201,082 B1 * 6/2012 Nordstrom et al. ........... 715/234
2006/0106840 A1 * 5/2006 Rooney ......................... 707/101
2007/0143442 A1 * 6/2007 Zhang et al. .................. 709/217
2007/0174233 A1 * 7/2007 Ginis et al. ....................... 707/2
2007/0245018 A1 * 10/2007 Bhola et al. ................... 709/225

OTHER PUBLICATIONS

Apache ZooKeeper. http://hadoop.apache.org/zookeeper/, Mar. 1, 2010.
Hdfs architecture. http://hadoop.apache.org/core/docs/current/hdfs_design.html, Mar. 1, 2010.
Java Message Service (JMS). http://java.sun.com/-products/jms/, Mar. 1, 2010.
Oracle WebLogic Products. http://www.oracle.com/appserver/index.html, Mar. 1, 2010.
TIBCO Enterprise Message Service. http://www.tibco.com/software/messaging/enterprise-message-service/default.jsp, Mar. 1, 2010.
Burrows, M. The Chubby lock service for loosely-coupled distributed systems. In Proc. OSDI, 2006.
Eugster, P. et al., "The many faces of publish/subscribe," ACM Computing Surveys, 35(2):114-131, Jun. 2003.
Ghemawat, S. et al., "The Google File System," *Proc. SOSP*, 2003.
"Welcome to Apache ZooKeeper!" *The Apache Software Foundation*, http://hadoop.apache.org/zookeeper/index.pdf, 2008.

(Continued)

*Primary Examiner* — Wing F Chan
*Assistant Examiner* — Benjamin M Thieu
(74) *Attorney, Agent, or Firm* — Dentons US LLP

(57) ABSTRACT

In one embodiment, a first one of a plurality of message processors receives a request with respect to a topic, and determines whether the first message processor itself is currently responsible for the topic. If so, then the first message processor services the request. If not, then the first message processor determines whether any of the other ones of the message processors is currently responsible for the topic. If so, then the request is redirected to another message processor to be serviced. If not, then the first message processor selects one of the message processors to be responsible for the topic and to service the request.

24 Claims, 6 Drawing Sheets

OTHER PUBLICATIONS

"Zookeeper Getting Started Guide," *The Apache Software Foundation*, http://hadoop.apache.org/zookeeper/docs/current/zookeeperStarted.pdf, 2008.

"ZooKeeper Programmer's Guide," *The Apache Software Foundation*, http://hadoop.apache.org/zookeeper/docs/current/zookeeperProgrammers.pdf, 2008.

* cited by examiner

DISTRIBUTED PUBLISH/SUBSCRIBE SYSTEM

TECHNICAL FIELD

The present disclosure generally relates to a publish/subscribe system and more specifically relates to a topic-based, distributed publish/subscribe system including multiple data centers, each of which serving a number of publishers and subscribers.

BACKGROUND

Publish/Subscribe, or simply pub/sub, is an asynchronous messaging paradigm. There may be any number of publishers and subscribers. Each publisher may publish any number of messages. However, a publisher is not programmed to send its messages to specific subscribers. Instead, the messages are grouped into any number of classes, often called "topics". That is, each message published by a publisher may belong to one or more of the topics. Each subscriber may express interest in one or more of the topics and receive messages belonging to those specific topics. In this sense, a subscriber subscribes to the specific topics of interest and receives only the messages belonging to those topics it subscribes. Alternatively, each subscriber may specify one or more content filters and receive messages that match to those content filters. Of course, an entity may be both a publisher and a subscriber, as the same entity may both publish messages and subscribe to topics.

SUMMARY

The present disclosure generally relates to a publish/subscribe system and more specifically relates to a topic-based, distributed publish/subscribe system including multiple data centers, each of which serving a number of publishers and subscribers.

In particular embodiments, a first one of a plurality of data centers of a publish/subscribe system comprises a message store operable to store one or more messages belonging to one or more topics; a metadata store operable to store information concerning the first data center; a cross-data-center component operable to exchange one or more of the messages with other ones of the data centers; and a plurality of message processors.

In particular embodiments, a first one of the message processors is operable to: receive a request with respect to a first one of the topics from a client device associated with a user and connected with the first message processor; determine whether the first message processor itself is currently responsible for the first topic; if the first message processor itself is currently responsible for the first topic, then service the request; and if the first message processor itself is not currently responsible for the first topic, then: determine whether any of other ones of the message processors is currently responsible for the first topic based on the information stored in the metadata store; if a second one of the message processors is currently responsible for the first topic, then redirect the request to the second message processor to be serviced; and if none of the other ones of the message processors is currently responsible for the first topic, then: select one of the message processors to be responsible for the first topic; if the selected one of the message processors is the first message processor, then service the request; and if the selected one of the message processors is not the first message processor, then redirect the request to the selected one of the message processors to be serviced.

These and other features, aspects, and advantages of the disclosure are described in more detail below in the detailed description and in conjunction with the following figures.

DETAILED DESCRIPTION

Figure 1:
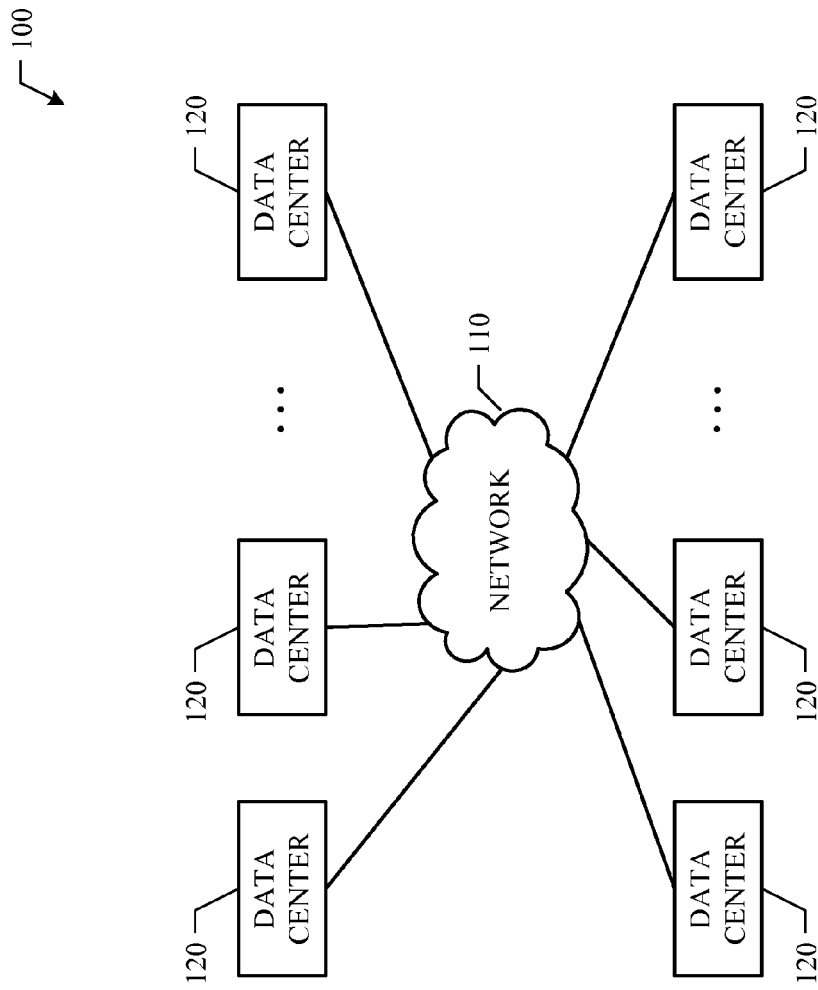
FIG. 1 illustrates an example architecture of a publish/subscribe system.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Typically in a publish/subscribe system, there may be one or more publishers and one or more subscribers. Each publisher may publish one or more messages. A message may have any format, such as, for example and without limitation, text, audio, video, graphic, or executable. The present disclosure contemplates any suitable message format. The publish/subscribe system may be topic-based. In this case, the messages may be grouped into one or more topics. In particular embodiments, each topic may have a unique topic name, such as, for example and without limitation, music, travel, sports, entertainment, education, or finance. The present disclosure contemplates any suitable topic name. A message may belong to one or more of the topics. Each subscriber may subscribe to one or more of the topics. When a subscriber subscribes to a specific topic, it receives all messages published to that topic, until the subscriber stops its subscription to the topic. Alternatively, the publish/subscribe system may be content-based. In this case, each subscriber may specify one or more content filters and receive all messages that match each of the content filters from any publisher. An entity may be both a publisher and a subscriber. Because the messages are grouped according to topics and the subscribers subscribe to specific topics, such a publish/subscribe system may be referred to as a topic-based publish/subscribe system.

In particular embodiments, a publish/subscribe system may provide a number of guarantees to its users (i.e., publishers and subscribers). First, some publish/subscribe systems may guarantee the delivery of the messages. That is, if a subscriber subscribes to a particular topic, it is guaranteed that the subscriber receives all the messages published to that topic after its subscription of the topic by all the publishers, until the subscriber stops its subscription of the topic. For example, with a topic-based publish/subscribe system, suppose that a subscriber, $u_1$, subscribes to a topic, $T_1$, at a certain time, $t_1$. With guaranteed delivery of the messages, $u_1$ is guaranteed to receive all messages published to $T_1$ after $t_1$, regardless of which publisher has actually published which message. However, $u_1$ is not guaranteed and in practice, is not likely to receive any message published to $T_1$ before $t_1$. Further suppose that $u_1$ un-subscribes to $T_1$ at a later time, $t_2$. Then, no message published to $T_1$ after $t_2$ is delivered to $u_1$.

Second, some publish/subscribe systems may guarantee the order of the messages when delivered. That is, if a subscriber subscribes to a particular topic, it is guaranteed that the subscriber receives the messages published to that topic in the same order as they are published. For example, again suppose that $u_1$ has subscribed to $T_1$. Further suppose that after $t_1$, there are three messages, $M_1$, $M_2$, and $M_3$, published to $T_1$, with $M_2$ published after $M_1$, and $M_3$ published after $M_2$. With guaranteed order of the messages, when the three messages are delivered to $u_1$, they are delivered in the order as they are published: $M_1$ followed by $M_2$ followed by $M_3$.

These guarantees bring various benefits to the publish/subscribe systems. For example, the guaranteed-delivery messaging is a powerful primitive: it allows distributed system components to communicate with each other without worrying about each others' failures. With respect to a publish/subscribe system, a guaranteed-delivery messaging system allows a publisher to submit a message for asynchronous delivery to any interested subscriber. Asynchrony allows the publisher to move on to other tasks without waiting for the subscribers to actually receive the message. Guaranteed delivery ensures that every subscriber eventually receives the message, even if it happens to be temporarily unavailable. Such a guaranteed-delivery primitive greatly simplifies building a distributed system since failures of individual system components may now be decoupled.

On the other hand, they also add to design or implementation complexities. For example, many existing publish/subscribe systems achieve their guaranteed delivery of the messages through the use of a shared-disk, which requires a significant upfront investment, cannot be incrementally scaled, and is problematic to share between major properties. More specifically, when using a shared-disk, messages are handled by soft-state or stateless hubs, which persist messages to a shared disk before acknowledging the publish. If a hub fails, another hub may attach to the same shared disk and restart message delivery from the log of persisted messages. Consequently, this shared disk must be highly reliable so that it can survive failures, which means that in practice, a Network-Attached Storage (NAS) device is often used. Deploying any of these solutions in production requires a significant investment in hardware and software and offers limited opportunity for elastic growth: much of the capacity, especially hardware capacity, needs to be provisioned and paid for up front. Moreover, since different properties need predictable performance, they cannot easily share certain hardware components in their deployment, since certain components can become a bottleneck and cause one property's performance spikes to degrade performance for another property. Both of these properties—inelasticity and inability to share—increase cost for equipment and operations, and in general, hinder progress towards cloud computing.

To remedy some of these limitations, particular embodiments provide a distributed, guaranteed-delivery messaging system that requires only inexpensive commodity machines to run and has low operational complexity, but can still provide stringent fault-tolerance guarantees. In particular embodiments, the guaranteed-delivery messaging system may be run on a collection of shared-nothing, commodity servers. The system is highly scalable as capacity may be added on-the-fly by adding new machines.

FIG. 1 illustrates an example architecture of a publish/subscribe system 100. In particular embodiments, publish/subscribe system 100 may include one or more data centers 120, $dc_1$ to $dc_n$, where n may be any positive integer. Data centers 120 may be communicatively connected to each other via a network 110 and communicate with each other (e.g., exchanging data) using any suitable network protocol. When needed, a new data center 120 may be added to publish/subscribe system 100 or an existing data center 120 may be removed from publish/subscribe system 100. Thus, publish/subscribe system 100 may be scalable through the adding or removing of the individual data centers 120. In particular embodiments, each data center 120 may service one or more users of publish/subscribe system 100, including one or more publishers or one or more subscribers. A user may publish or subscribe messages via a data center 120. Furthermore, a user may move from one data center 120 to another data center 120 as it desires.

In particular embodiments, publish/subscribe system 100 is topic-based and provides guaranteed delivery of the messages. Publish/subscribe system 100 may have any number of users, which are the publishers and subscribers. Note that a user is not necessarily a human, but may be any entity. In particular embodiments, there may be any number of named topics, and the publishers publish to and the subscribers subscribe to the individual topics. New topics may be created by publish/subscribe system 100 or by individual users when needed. When a publisher publishes a message, the message is associated with one or more topics. If a subscriber subscribes to a topic, it is guaranteed to receive all messages published to that topic by any publisher during the period of its subscription. To achieve guaranteed delivery of the messages, in particular embodiments, publish/subscribe system 100 delivers, and if necessary redelivers, every message of a topic to every current subscriber of that topic until all current subscribers acknowledge receipt of the message.

In particular embodiments, publish/subscribe system 100 guarantees delivery of the messages while a user is serviced by a particular data center 120. For example, suppose a user $u_1$ is serviced by a data center $dc_1$ and subscribes to a topic $T_1$. While $u_1$ is serviced by $dc_1$, even though $u_1$ may be disconnected from $dc_1$ from time to time, it is guaranteed that $u_1$ eventually receives all messages published to $T_1$, including those message published while $u_1$ is disconnected from $dc_1$. On the other hand, if $u_1$ moves to another data center, $dc_2$, in particular embodiments, once $u_1$ is connected to $dc_2$, $u_1$ may need to re-subscribe to $T_1$. In this case, it is guaranteed that $u_1$ eventually receives all messages published to $T_1$ after the re-subscription through $dc_2$. However, there may be some messages published before $u_1$'s re-subscription at $dc_2$ (e.g., messages published while $u_1$ moves from $dc_1$ to $dc_2$) that may not be delivered to $u_1$.

In particular embodiments, publish/subscribe system 100 may further guarantee that when the messages are delivered to a subscriber, they are delivered in the same order as the messages are originally published within each data center 120. However, publish/subscribe system 100 does not guarantee a global ordering of all the messages among all data centers 120. For example, suppose a first data center, $dc_1$, services two users, $u_1$ and $u_2$; a second data center, $dc_2$, services three users, $u_3$, $u_4$, and $u_5$; and a third data center, $dc_3$ services three users, $u_6$, $u_7$, and $u_8$. Further suppose that to a particular topic, $T_1$, $u_1$ has published three messages, $M_1$, $M_2$, and $M_3$, in that order; $u_3$ has published two messages, $M_4$ and $M_5$, in that order; and $u_6$ and $u_7$ together have published three messages, $M_6$, $M_7$, and $M_8$, in that order, with $M_6$ and $M_8$ published by $u_6$ and $M_7$ published by $u_7$. Then, $dc_1$ is the data center to which $M_1$, $M_2$, and $M_3$ are first published; $dc_2$ is the data center to which $M_4$ and $M_5$ are first published; and $dc_3$ is the data center to which $M_6$, $M_7$, and $M_8$ are first published. If $u_2$ has subscribed to $T_1$, then when delivering the eight messages to $u_2$, the three messages first published to $dc_1$ are guaranteed to be delivered in the order of their publication among themselves; the two messages first published to $dc_2$ are guaranteed to be delivered in the order of their publication among themselves; and the three messages first published to $dc_3$ are guaranteed to be delivered in the order of their publication among themselves. However, in particular embodiments, publish/subscribe system 100 does not guarantee that all eight messages are delivered to $u_2$ according to the global order of their publication. Thus, the eight messages may be delivered as $M_1$, $M_4$, $M_2$, $M_3$, $M_6$, $M_7$, $M_5$, and $M_8$, even though according to publication times, $M_4$ may have been published before $M_1$, or $M_5$ may have been published before $M_6$. Such an ordering may be referred to as a data-center based partial ordering.

In particular embodiments, publish/subscribe system 100 does not use the publication timestamps of the messages to achieve the partial ordering of the messages, because data centers 120 may be physically located in different parts of the world and it is difficult to reconcile the time differences around the world. Instead, each data center 120 may maintain a counter for the messages published by those users connected to that data center 120. When a user publishes a new message through a client device connected with a data center 120, the data center 120 may assign the current message counter to that new message and then increment the message counter by one. The messages are then delivered according to their associated counters, such that a message with a lower counter is delivered before a message with a higher counter. In addition, each message, when first published, may be associated with a unique identifier of the data center 120 to which its publisher is connected while publishing the message (i.e., the original data center 120 where the message is first published). When the messages are shared among multiple data centers 120, each data center 120 may determine which message is originally published at which data center 120 based on the associated data-center identifier. When delivering messages to a subscriber, to ensure data-center based partial ordering, a message's counter is compared against the counters of the other messages originally published in the same data center 120 as the message.

Figure 2:
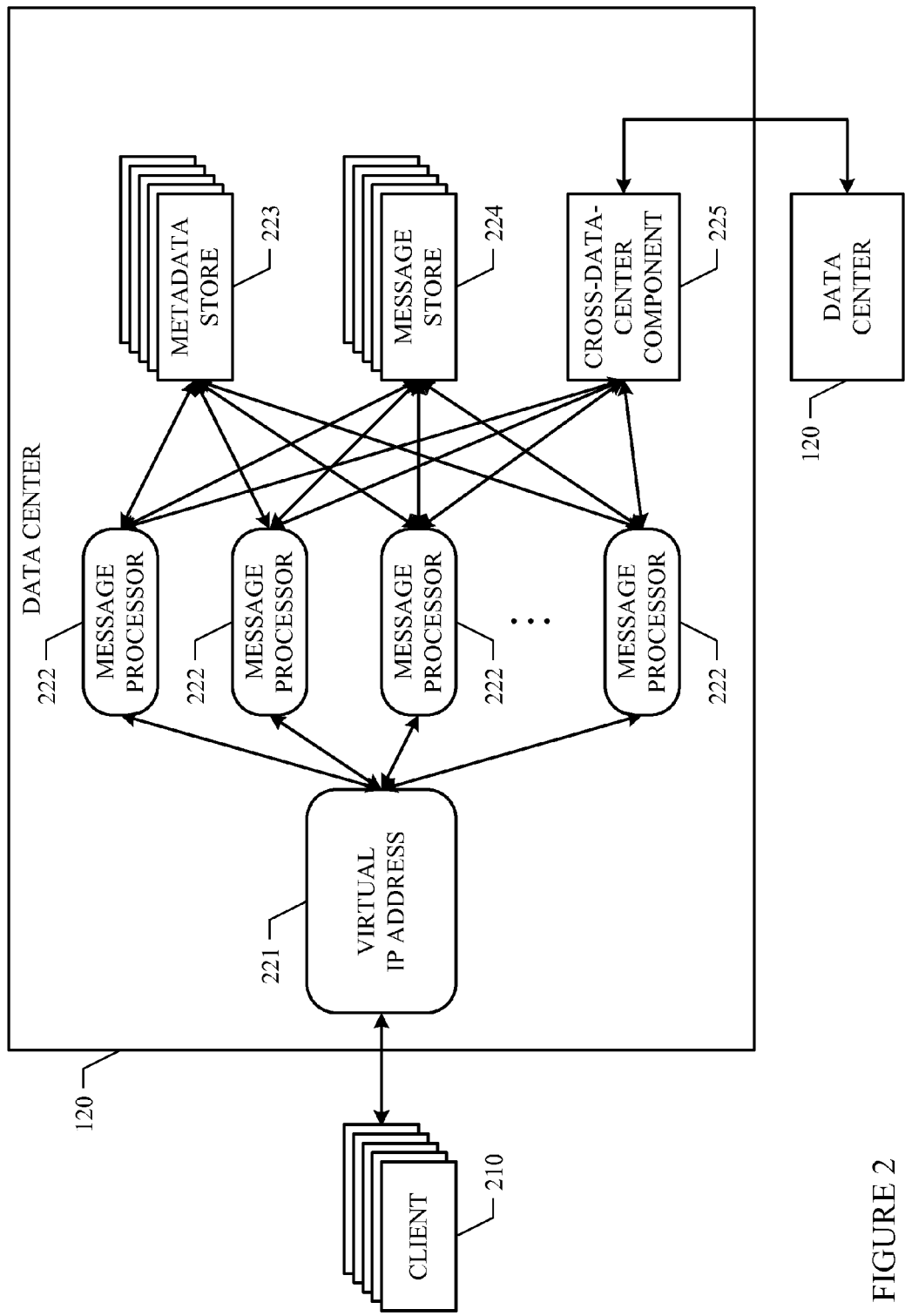
FIG. 2 illustrates an example architecture of a data center of a distributed publish/subscribe system.

In particular embodiments, each data center 120 may have a similar or substantially the same architecture as the other data centers 120. FIG. 2 illustrates an example architecture of a data center 120 of publish/subscribe system 100.

In particular embodiments, data center 120 may include a message store 224 for storing the messages published by the publishers of publish/subscribe system 100. In particular embodiments, message store 224 is a persistent store that stores the messages durably despite failures. In particular embodiments, message store 224 may include one or more storage units, and new storage units may be added to message store 224 when needed, thus achieving scalability.

In particular embodiments, message store 224 may be implemented using Yahoo! Bookkeeper, which is a distributed logging service developed by Yahoo! Research. In particular embodiments, Bookkeeper operates multiple servers, called "bookies", that receive log messages and append them to log files called "ledgers". Depending on the number of failures to be tolerated (e.g., n), each log message is written in parallel to n+1 bookies (e.g., two bookies to tolerate one failure), and is considered committed when all bookies persist the message. If a bookie fails, the lost data is available at the other bookies. To ensure high throughput, the bookies first persist messages to a common sequential log, and then lazily write to ledger files using the file system cache. Bookkeeper may be scaled by adding new bookies.

In particular embodiments, data center 120 may include a metadata store 223 for storing information relating to the publication and subscription service, such as which subscribers subscribe to which topics, which messages have been delivered and acknowledged by which subscribers, which message processors 222 (described below) are responsible for which topics, which message processors 222 are currently functional, and so on. In particular embodiments, metadata store 223 may include one or more storage units, and new storage units may be added to metadata store 223 when needed, thus achieving scalability.

In particular embodiments, metadata store 223 may be implemented using Apache Zookeeper, which is a distributed consistency service. Zookeeper is a centralized service for maintaining configuration information, naming, providing distributed synchronization, and providing group services. When a client writes some data in Zookeeper, the update is atomically committed to multiple Zookeeper servers so that the data can survive a failure. To provide high throughput, Zookeeper maintains its data in memory and thus is more appropriate as a metadata store rather than a data store.

Although in FIG. 2, metadata store 223 and message store 224 are illustrated as two separate components, in practice, the same hardware component (e.g., a database server in connection with a number of hard drives) may host both metadata store 223 and message store 224 or different hardware components may host metadata store 223 and message store 224 separately.

In particular embodiments, data center 120 may include one or more message processors 222, $mp_1$ to $mp_n$, where n may be any positive integer, for receiving messages from the publishers, updating message store 224 and metadata store 223, and delivering messages to the subscribers. Each message processor 222 may also be called a "hub" and may be implemented as a server. In particular embodiments, new message processors 222 may be added to data center 120 when needed, thus achieving scalability. In particular embodiments, each message processor 222 may be responsible for one or more topics, and each topic is assigned to one message processor 222 at any given time.

In particular embodiments, data center 120 may service one or more users associated with one or more client devices 210, and a user may be a publisher or a subscriber or both. Each message processor 222 may service one or more of clients 210. In particular embodiments, clients 210 may connect to message processors 222 through a virtual IP address 221 or DNS round-robin. Note that unless the virtual IP address scheme is used, virtual IP address component 221 is not required. In particular embodiments, each message processor 222 may be responsible for accepting published messages on a topic and persisting those messages to message store 224. Each message processor 222 may also accept subscription requests for topics, and record the subscriptions in metadata store 223. In particular embodiments, each message processor 222 may retrieve messages out of message store 224 and deliver them to the subscribers and record in metadata store 223 which subscribers have acknowledged which messages. This may also indicate the last message that has been delivered to and received by a subscriber as the publication order of the messages within data center 120 may be determined based on the counters assigned to the individual messages.

For example, suppose that a user, $u_1$, is connected to a data center, $dc_1$, via its client device. The Virtual IP address of $dc_1$ may select one of the message processors, $mp_3$, to service $u_1$, or more precisely, to service the client device used by $u_1$. Further suppose that $u_1$ publishes a message, $M_1$, that belongs to a topic, $T_5$. Since each topic is assigned to one of the message processors of $dc_1$ at any given time, $T_5$ may or may not be assigned to $mp_3$ at this time. If $mp_3$ is currently responsible for $T_5$, then $mp_3$ may persistently store $M_1$ in the message store of $dc_1$ and update the relevant information in the metadata store (e.g., metadata relating to $T_5$, $M_1$, or $u_1$) of $dc_1$. On the other hand, if $mp_3$ is not currently responsible for $T_5$, then $mp_3$ may determine, from the metadata store of $dc_1$, which message processor is responsible for $T_5$ at the present. Suppose that another message processor, $mp_6$, is currently responsible for $T_5$. Then, $mp_3$ may forward $M_1$ to $mp_6$ to be processed (e.g., for persistent store). Alternatively, $mp_3$ may redirect $u_1$'s client device together with $M_2$ to $mp_6$ so that $mp_6$ may handle $u_1$'s publication request.

As another example, suppose that another user, $u_2$, is connected to $dc_1$ via its client device. The Virtual IP address of $dc_1$ may select another one of the message processors, $mp_4$, to service $u_2$, or more precisely, to service the client device used by $u_2$. Further suppose that $u_2$ subscribes to a topic, $T_3$. Again, since each topic is assigned to one of the message processors of $dc_1$ at any given time, $T_3$ may or may not be assigned to $mp_4$ at this time. If $mp_4$ is currently responsible for $T_3$, then $mp_4$ may retrieve all the messages belonging to $T_3$ that have not yet been delivered to $u_2$ from the message store of $dc_1$ based on the relevant information stored in the metadata store of $dc_1$ and deliver the messages to $u_2$. On the other hand, if $mp_4$ is not currently responsible for $T_3$, then $mp_4$ may determine, from the metadata store of $dc_1$, which message processor is responsible for $T_3$ at the present. Suppose that another message processor, $mp_1$, is currently responsible for $T_3$. Then, $mp_4$ may send a request to $mp_1$, which in turn retrieve the messages belonging to $T_3$ that have not yet been delivered to $u_2$ from the message store of $dc_1$ based on the relevant information stored in the metadata store of $dc_1$ and deliver the messages to $mp_4$, which in turn deliver the messages to $u_2$. Alternatively, $mp_4$ may redirect $u_2$'s client device to $mp_1$ so that $mp_1$ may handle $u_1$'s subscription request.

In particular embodiments, an automatic failover scheme is applied to message processors 222. In particular embodiments, each message processor 222 is responsible for a number of topics at any given time, and information stored in metadata store 223 indicates which message processor 222 is currently responsible for which topics and which message processor 222 is currently functional. If any one of message processors 222 has failed due to any cause (i.e., that message processor 222 is no longer functional), then the topics for which the failed message processor 222 has been responsible are automatically assigned to the other message processors 222 that are still functional. In particular embodiments, the metadata stored in metadata store 223 indicates which message processors 222 are currently functioning correctly and which message processors 222 have failed, as well as which message processors 222 are currently responsible for which specific topics.

Using the above example, suppose that $u_2$ is connected to $mp_4$ of $dc_1$ and that $u_2$ subscribes to $T_3$. Further suppose that another message processor, $mp_5$, has been responsible for $T_3$. Since $mp_4$ of is not currently responsible for $T_3$, upon receiving a request for messages belonging to $T_3$ from $u_2$, $mp_4$ may determine, from the metadata store of $dc_1$, which message processor is currently responsible for $T_3$. If, at this time, $mp_5$ has failed due to some problem, then the information stored in the metadata store of $dc_1$ may indicate that none of the functional message processors is currently responsible for $T_3$. In particular embodiments, $mp_4$ may select another functional message processor (e.g., $mp_2$) to be responsible for $T_3$. The information stored in the metadata store of $dc_1$ may be updated accordingly to reflect that $mp_2$ is now responsible $T_3$, and $mp_2$ may be notified so that it begins handling the messages belonging to $T_3$ (e.g., publishing and subscribing requests from the users). The same message-processor-selection process may be repeated when individual users publish or subscribe to other topics for which the failed $mp_5$ has been responsible, and one by one, these topics may be automatically assigned to other functional message processors.

The message-processor-selection process may be applied when a new topic is first requested by a user in connection with publication or subscription as well. Using the above example, suppose that in addition to $T_3$, $u_2$ also wishes to subscribe to another topic, $T_8$. Further supposed that no user connected to $dc_1$ has previously published or subscribed to $T_8$. Thus, $T_8$ is a new topic with respect to $dc_1$, and no message processor is currently responsible for $T_8$. Similarly, $mp_4$ may select another functional message processor (e.g., $mp_1$) to be responsible for $T_8$. The information stored in the metadata store of $dc_1$ may be updated accordingly to reflect that $mp_1$ is now responsible $T_8$, and $mp_1$ may be notified so that it begins handling the messages belonging to $T_8$ (e.g., publishing and subscribing requests from the users).

In particular embodiments, a load balancing scheme may be applied when selecting a message processor 222 to be responsible for a topic either when another message processor 222 has failed or when a new topic has been requested. In particular embodiments, each message processor 222 may store its current load information in metadata store 223, and the load information may be updated when needed. When it is necessary to select a message processor 222 for a topic, the message processor 222 with the least load may be selected. Of course, other load balancing schemes may be used, and the present disclosure contemplates any suitable load balancing scheme.

In connection with balancing the workloads among message processors 222, when a new message processor 222 is added to data center 120, some of the topics may be moved from certain existing message processors 222 (e.g., existing message processors 222 responsible for relatively large number of topics) to the new message processor 222, thus lightening the workloads of these existing message processors 222. Similarly, some of the topics currently assigned to a message processor 222 having a relatively higher workload may be reassigned to another message processor 222 having a relatively lower workload. In this sense, the workloads may be continuously balanced among message processors 222 by moving selected topics from message processors 222 having relatively higher workloads to message processors 222 having relatively lower workloads.

The following illustrates the processing logic of a message processor 222 when receiving a request in connection with a topic from user.

TOPIC OWNERSHIP LOGIC AT A MESSAGE PROCESSOR

```
     sub request(topic)
1    if (hub[topic] exists){
2       if (hub[topic] == self)
3          return handle(request);
4       else
5          redirect(hub[topic]);
6    } else {
7       if (request has been redirected){
8          create ephemeral node for topic;
9          hub[topic] = self;
10         return handle(request);
11      }else
12         redirect (least loaded hub) ;
13   }
```

In particular embodiments, data center 120 may include a cross-data-center component 225 for receiving and sending the relevant messages to other data centers 120 in publish/subscribe system 100. In particular embodiments, to retrieve messages from the other data centers 120, each data center 120 behaves as a regular subscribe to the other data centers 120. In particular embodiments, each data center 120 may subscribe directly to all other data centers 120 in publish/subscribe system 100 (i.e., a "all-to-all" approach). In particular embodiments, cross-data-center component 225 may be responsible to subscribe to topics and retrieves messages from the other data centers 120.

Although in FIG. 2, cross-data-center component 225 is illustrated as a separate component from message processors 222, in particular embodiments, the functionalities of cross-data-center component 225 may be implemented in each message processor 222 so that each message processor 222 directly sends and receives messages to and from other data centers 120.

Using the above example, suppose that $u_2$ is connected to $mp_4$ of $dc_1$ and that $u_2$ subscribes to $T_3$. Since any publisher may publish messages that belong to a topic, there may be publishers connected to other data centers (e.g., $dc_2$ and $dc_3$) that have also published messages to $T_3$, which have not been delivered to $u_2$. To obtain these messages, $dc_1$ may, through its cross-data-center component, subscribe to $T_3$ from $dc_2$ and $dc_3$. In this sense, $dc_1$ becomes a subscriber of $T_3$ with respect to $dc_2$ and $dc_3$, and may receive messages belonging to $T_3$ from $dc_2$ and $dc_3$ similarly as a user subscriber connected to $dc_2$ or $dc_3$ receiving messages belonging to $T_3$ from $dc_2$ or $dc_3$. Once that $dc_1$, through its cross-data-center component, has received messages from the other data centers, the messages may be persistently stored in the message store of $dc_1$, and delivered to subscribers of $T_3$, such as $u_2$.

To avoid sending duplicate messages among the data centers, in particular embodiments, when sending messages to other data centers, each data center may only send the messages published by those publishers connected to the data center itself. Thus, the messages a first data center has received from a second data center as a subscriber of the second data center are not resend to a third data center when the third data center subscribes messages from the first data center. On the other hand, the messages that are first published to the first data center are send to the third data center. To distinguish a data-center subscriber from a user subscriber, in particular embodiments, a indicator (e.g., a flag) may be associated with each data-center subscriber.

In particular embodiments, cross-data-center component 225 of a data center 120 may handle subscription requests from cross-data-center components of the other data centers. That is, message processors 222 may handle user requests, while cross-data-center component 225 may handle requests originated from other data centers. Thus, cross-data-center component 225 of each data center 120 may avoid sending duplicate messages among the data centers 120.

In particular embodiments, each data center 120 may implement a garbage-collection scheme for deleting old messages from message store 224. A message is needed for as long as it is necessary to deliver it to all of its subscribers. When a subscriber receives a message, it may acknowledge that the message has been received. Thus, when all subscribers that subscribe to a message have acknowledged that the message has been received, that message may be deleted from message store 224 as the message is no longer needed. In particular embodiments, it is not necessary that each subscribes acknowledges the receipt of each and every message. If a subscriber acknowledges the receipt of a particular message, it may be assumed that all the messages sent to that subscriber prior to the particular message have also been received by the subscriber. For example, if a subscriber has acknowledged that it has received a message having a counter of 10, then it may be assumed that this subscriber has received all messages having counters less than 10.

Publish/subscribe system 100 is designed to be horizontally scalable. For each data center 120, if more message processing capacity is needed, more message processors 222 may be added and the topics may be automatically redistributed to the new message processors 222. If more I/O (input/output) capacity for message persistence is needed, more servers may be added to message store 224. In practice, metadata store 223 may not likely to be a bottleneck of a data center 120 as updates to the metadata are relatively infrequent in comparison to updates to the messages stored in message store 224. Nevertheless, if needed, more servers may be added to metadata store 223 as well.

Figure 3:
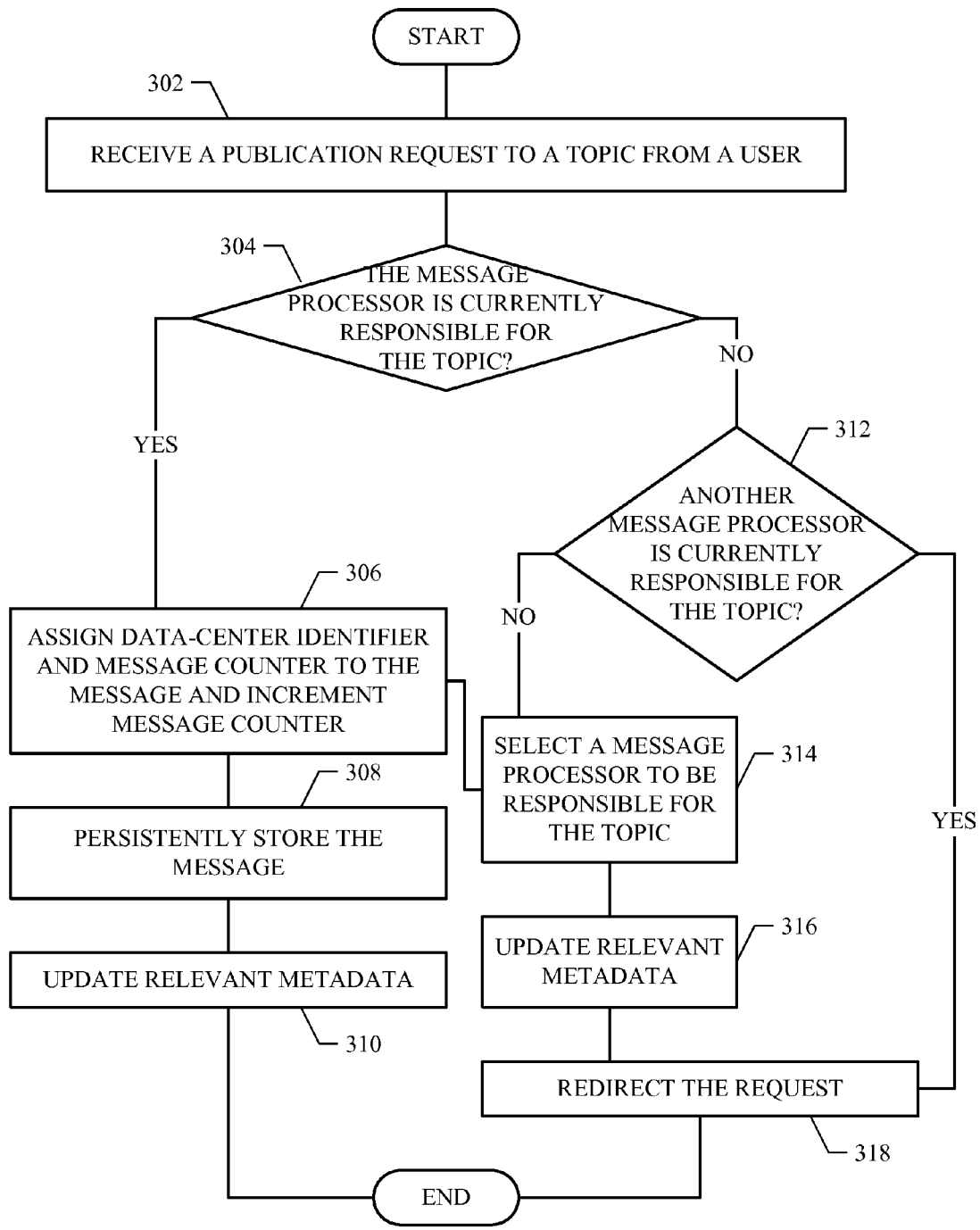
FIG. 3 illustrates an example method for processing a publication request.

FIG. 3 illustrates an example method for processing a publication request. In particular embodiments, upon receiving a publication request in connection with a topic from a user (step 302), such as when the user publishes a message to the topic, the message processor to which the user's client device is connected determines whether itself is current responsible for the topic (step 304). If it is (step 304, "YES"), then the message processor handles the publication request. In particular embodiments, the message processor assigns the data-center identifier to which the message processor belongs and the current message counter to the message and increments the message counter by one (step 306). The message processor then persistently stores the message (step 308) and updates the metadata relevant to the publication request (step 310), such as indicating that a new message has been published to the topic.

On the other hand, if the message processor is not currently responsible for the topic (step 304, "NO"), then in particular embodiments, the message processor determines if another message processor is currently responsible for the topic (step 312). If so (step 312, "YES"), the message processor redirects the publication request to the other message processor to be handled (step 318). If not (step 312, "NO"), that is, no message processor is currently responsible for the topic, the message processor may select one of the message processors to be responsible for the topic (step 314). Here, there are two possibilities with respect to the selection of one of the message processors to be responsible for the topic: first, the message processor may select another message processor (i.e., other than itself), and second, the message processor may select itself. In either case, the message processor updates the metadata relevant to the selection (step 316), such as indicating which one of the message processors (i.e., itself or another message processor) has been selected to be responsible for the topic. If another message processor has been selected, the message processor may notify the other, selected message processor, and redirect the publication request to the other message processor to be handled (step 318). On the other hand, if the message processor itself has been selected, the message processor may handle the publication request in an appropriate manner (e.g., proceeding to step 306).

In particular embodiments, a client device may maintain a persistent connection with a particular message processor once the client device has been directed to the message processor currently responsible for a particular topic with which the user of the client device publishes messages. In this case, subsequent message publication in that topic does not result in the client device being redirected again and again since the client device has already been connected with the particular message processor that is currently responsible for the topic in question.

Figure 4:
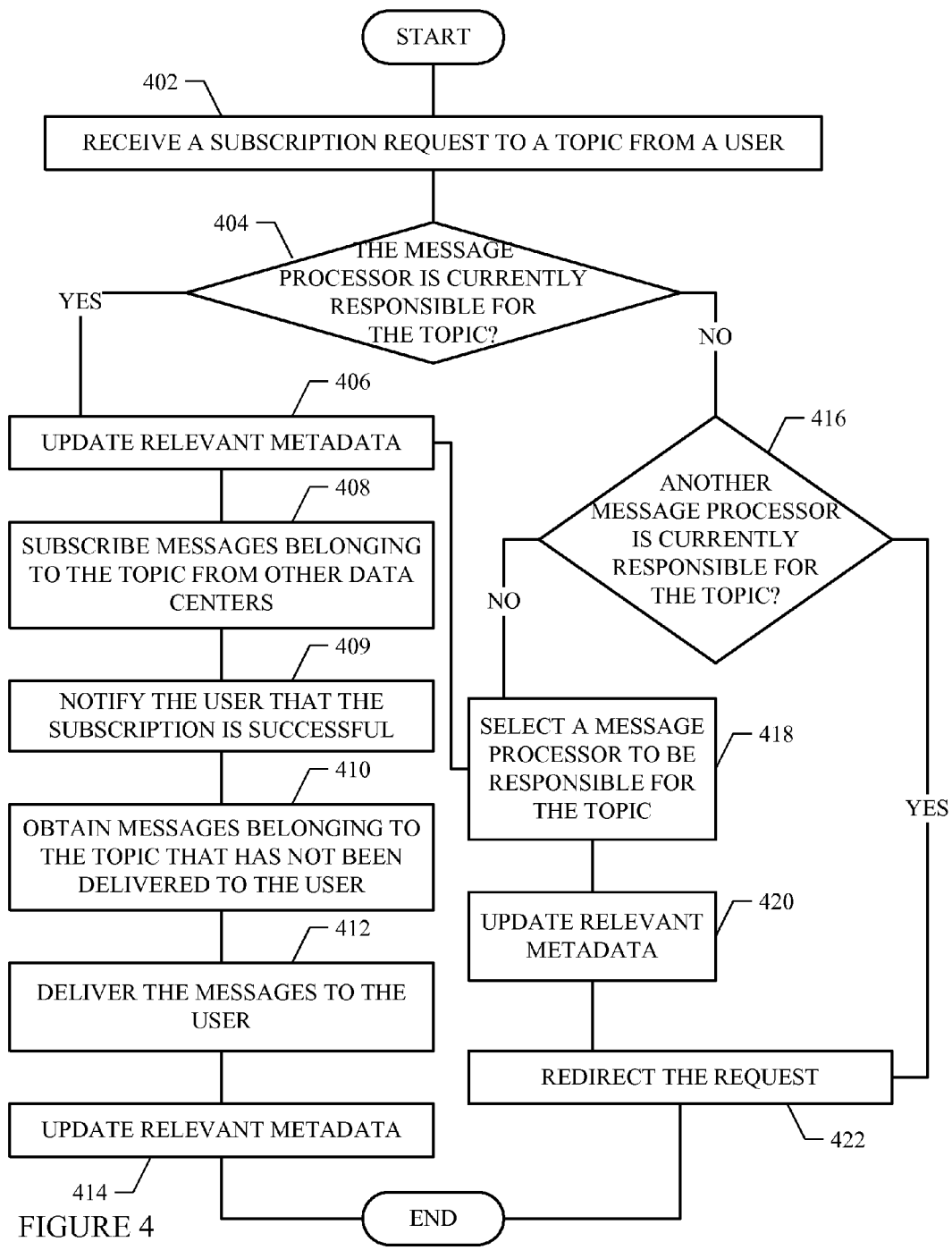
FIG. 4 illustrates an example method for processing a subscription request.

FIG. 4 illustrates an example method for processing a subscription request. In particular embodiments, upon receiving a subscription request in connection with a topic from a user (step 402), such as when the user starts subscription to the topic or when the user connects to a data center, the message processor to which the user's client device is connected determines whether itself is current responsible for the topic (step 404). If it is (step 404, "YES"), then the message processor handles the subscription request. In particular embodiments, the message processor may update the metadata relevant to the subscription request (step 406), such as recording information concerning the subscription request so that the existence of this particular subscription request is recorded in the metadata store. This prevents the messages that are a part of the subscription request from being deleted (i.e., garbage collected) from the message store before they are successfully delivered to the user. In particular embodiments, the message processor may obtain messages that belong to the topic from other, remote data centers (step 408). The message processor may directly subscribe these messages from the other data centers itself or via the cross-data-center component with which the message process may be connected. The message processor may also update the metadata stored in the metadata store to reflect this cross-data-center subscription action. In addition, the metadata stored in the metadata store of each of the other data centers may also be updated to reflect this cross-data-center subscription action. As a result, each data center is aware which data center has subscribed what messages from which data centers. In particular embodiments, the message processor may, via the user's client device, notify the user sending the subscription request that his subscription request has been received (step 409) so that the user does not send multiple subscription requests for the same messages.

In particular embodiments, the message processor may obtain all the messages belonging to the topic that has not been delivered to the user (step 410). Whether a message belonging to a topic has been delivered to a user may be determined based on the metadata stored at the data center. The message processor may obtain these messages locally, from among the messages stored at the data center, or remotely from other data centers via subscription requests to the other data centers. The message processor then delivers the messages to the user (step 412) and updates the metadata relevant to the subscription request (step 414), such as indicating which messages have been delivered to the user.

On the other hand, if the message processor is not currently responsible for the topic (step 404, "NO"), then in particular embodiments, the message processor determines if another message processor is currently responsible for the topic (step 416). If so (step 416, "YES"), the message processor redirects the subscription request to the other message processor to be handled (step 422). If not (step 416, "NO"), that is, no message processor is currently responsible for the topic, the message processor may select one of the message processors to be responsible for the topic (step 418). Again, there are two possibilities with respect to the selection of one of the message processors to be responsible for the topic: first, the message processor may select another message processor (i.e., other than itself), and second, the message processor may select itself. In either case, the message processor updates the metadata relevant to the selection (step 420), such as indicating which one of the message processors (i.e., itself or another message processor) has been selected to be responsible for the topic. If another message processor has been selected, the message processor may notify the other, selected message processor, and redirect the subscription request to the other message processor to be handled (step 422). On the other hand, if the message processor itself has been selected, the message processor may handle the subscription request in an appropriate manner (e.g., proceeding to step 406).

In particular embodiments, a client device may maintain a persistent connection with a particular message processor once the client device has been directed to the message processor currently responsible for a particular topic with which the user of the client device subscribes messages. In this case, subsequent message subscription in that topic does not result in the client device being redirected again and again since the client device has already been connected with the particular message processor that is currently responsible for the topic in question.

In particular embodiments, a client device may maintain a persistent connection with a particular message processor once the client device has been directed to the message processor currently responsible for a particular topic with which the user of the client device publishes or subscribes messages. In this case, subsequent message publication or subscription in that topic does not result in the client device being redirected again and again since the client device has already been connected with the particular message processor that is currently responsible for the topic in question.

Figure 5:
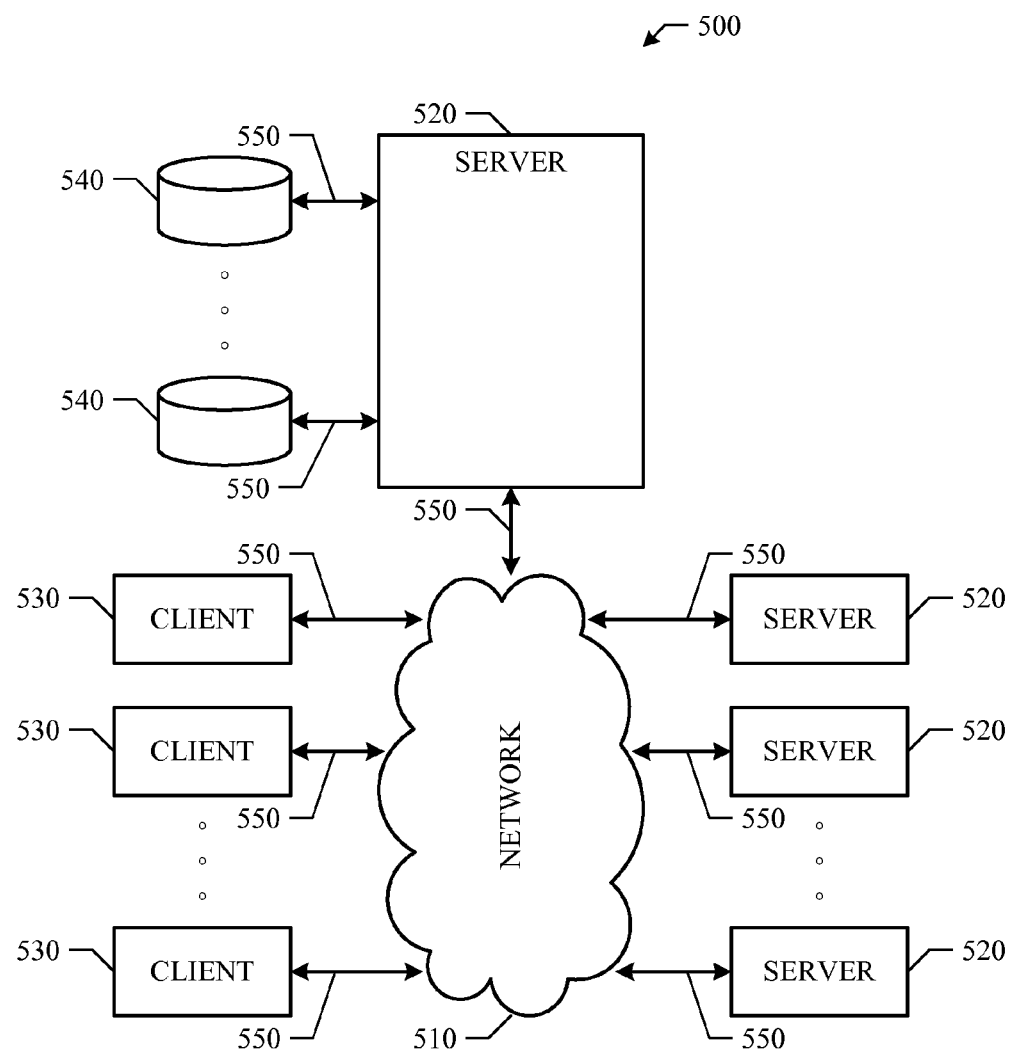
FIG. 5 illustrates an example network environment.

Particular embodiments may be implemented in a network environment. FIG. 5 illustrates an example network environment 500. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 510 or a combination of two or more such networks 510. The present disclosure contemplates any suitable network 510.

One or more links 550 couple servers 520 or clients 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. A client 530 may enable a network user at client 530 to access network 510. A client 530 may have a web browser, such as Microsoft Internet Explorer or Mozilla Firefox, and may have one or more add-ons, plug-ins, or other extensions, such as Google Toolbar or Yahoo Toolbar. A client 530 may enable its user to communicate with other users at other clients 530. The present disclosure contemplates any suitable clients 530.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. Particular embodiments may provide interfaces that enable servers 520 or clients 530 to manage (e.g., retrieve, modify, add, or delete) the information stored in data storage 540.

Figure 6:
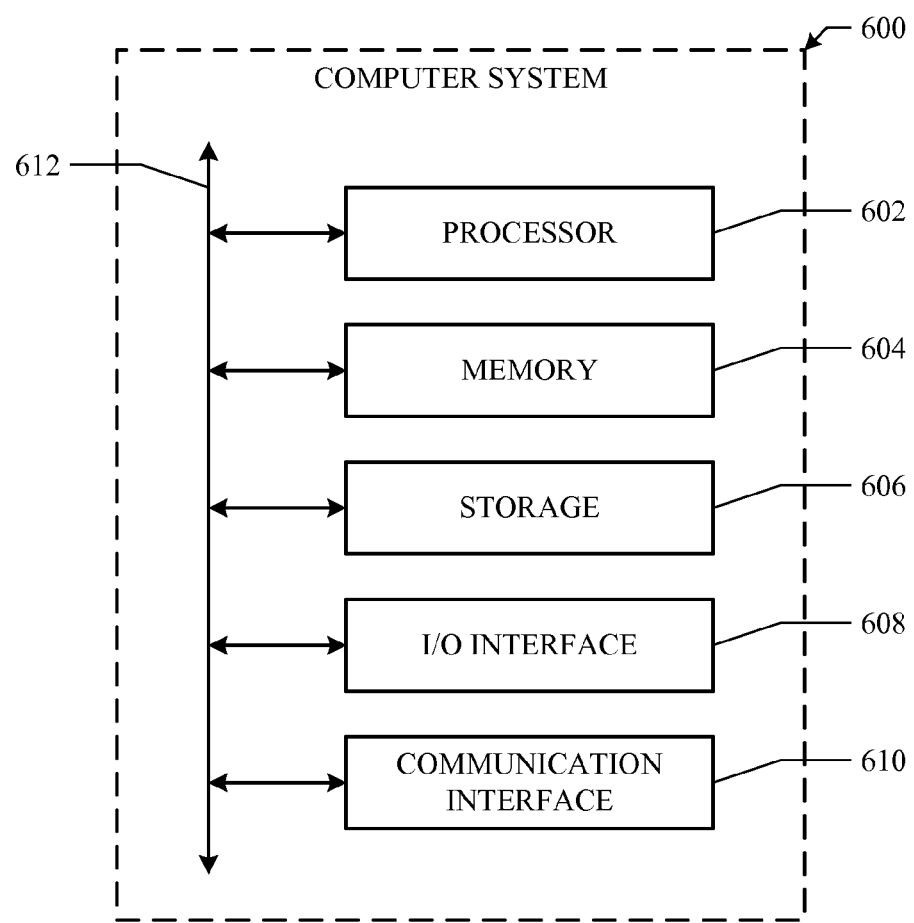
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604.

Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A first data center, included in plurality of data centers of a publish/subscribe system, comprising:
a message store operable to store one or more messages belonging to one or more topics;
a metadata store operable to store information concerning the first data center;
a cross-data-center component operable to exchange one or more of the messages with other ones of the data centers; and
a plurality of message processors, wherein a first one of the message processors is operable to:
receive a request with respect to a first one of the topics from a client device associated with a user and connected with the first message processor;
determine whether the first message processor itself is currently responsible for the first topic;
if the first message processor itself is currently responsible for the first topic, then service the request; and
if the first message processor itself is not currently responsible for the first topic, then:
determine whether any of other ones of the message processors is currently responsible for the first topic based on the information stored in the metadata store;
if a second one of the message processors is currently responsible for the first topic, then redirect the request to the second message processor to be serviced; and
if none of the other ones of the message processors is currently responsible for the first topic, then:
select one of the message processors to be responsible for the first topic;
if the selected one of the message processors is the first message processor, then service the request; and
if the selected one of the message processors is not the first message processor, then redirect the request to the selected one of the message processors to be serviced.

2. The first data center recited in claim 1, wherein:
each one of the message processors is responsible for one or more of the topics; and
each one of the topics is assigned to one of the message processors at any given time.

3. The first data center recited in claim 1, wherein:
the request is a publication request, wherein the user desires to publish a message to the first topic; and
to service the publication request, the first message processor is operable to:
associate an identifier of the first data center and a value of a message counter to the message;
increment the value of the message counter;
store the message in the message store; and
update the information stored in the metadata store with respect to the message.

4. The first data center recited in claim 1, wherein:
the request is a subscription request, wherein the user desires to receive messages published to the first topic; and
to service the subscription request, the first message processor is operable to:
subscribe to the first topic from one or more second ones of the data centers through the cross-data-center component;
retrieve all messages belonging to the first topic that have not been delivered to the user from the message store based on the information stored in the metadata store; and
deliver the retrieved messages to the client device associated with the user.

5. The first data center recited in claim 1, wherein to select one of the message processors to be responsible for the first topic, the first message processor is operable to:
determine a workload of each one of the message processors based on the information stored in the metadata store; and
select the one message processor that has the least workload to be responsible for the first topic.

6. The first data center recited in claim 1, wherein the cross-data-center component is further operable to transmit a subscription request with respect to the first topic to each one of one or more second ones of the data centers;

receive one or more messages belonging to the first topic from each one of the second data centers; and store the received messages in the message store.

7. The first data center recited in claim 1, wherein the cross-data-center component is further operable to:
receive a subscription request with respect to a second one of the topics from a second one of the data centers;
retrieve all messages belonging to the second topic that have been published by one or more users connected with the first data center and have not been delivered to the second data center from the message store based on the information stored in the metadata store, and
transmit the retrieved messages to the second data centers.

8. The first data center recited in claim 1, wherein the first message processor is further operable to assign one or more of the topics the first message processor is currently responsible for to one or more other ones of the message processors.

9. A method, implemented on a first one of a plurality of message processors of a first one of a plurality of data centers of a publish/subscribe system, comprising:
receiving a request with respect to a first one of the topics from a client device associated with a user and connected with the first message processor;
determining whether the first message processor itself is currently responsible for the first topic;
if the first message processor itself is currently responsible for the first topic, then servicing the request; and
if the first message processor itself is not currently responsible for the first topic, then:
determining whether any of other ones of the message processors is currently responsible for the first topic based on information concerning the first data center stored in a metadata store of the first data center;
if a second one of the message processors is currently responsible for the first topic, then redirecting the request to the second message processor to be serviced; and
if none of the other ones of the message processors is currently responsible for the first topic, then:
selecting one of the message processors to be responsible for the first topic;
if the selected one of the message processors is the first message processor, then servicing the request; and
if the selected one of the message processors is not the first message processor, then redirecting the request to the selected one of the message processors to be serviced.

10. The method recited in claim 9, wherein:
each one of the message processors is responsible for one or more of the topics; and
each one of the topics is assigned to one of the message processors at an given time.

11. The method recited in claim 9, wherein:
the request is a publication request, wherein the user desires to publish a message to the first topic; and
servicing the publication request comprises:
associating an identifier of the first data center and a value of a message counter to the message;
incrementing the value of the message counter;
storing the message in a message store of the first data center; and
updating the information stored in the metadata store with respect to the message.

12. The method recited in claim 9, wherein,
the request is a subscription request, wherein the user desires to receive messages published to the first topic; and
servicing the subscription request comprises:
subscribing to the first topic from one or more second ones of the data centers through a cross-data-center component of the first data center;
retrieving all messages belonging to the first topic that have not been delivered to the user from a message store of the first data center based on the information stored in the metadata store and
delivering the retrieved messages to the client device associated with the user.

13. The method recited in claim 9, wherein selecting one of the message processors to be responsible for the first topic comprises:
determining a workload of each one of the message processors based on the information stored in the metadata store; and
selecting the one message processor that has the least workload to be responsible for the first topic.

14. The method recited in claim 9, further comprising, by a cross-data-center component of the first data center:
transmitting a subscription request with respect to the first topic to each one of one or more second ones of the data centers;
receiving one or more messages belonging to the first topic from each one of the second data centers; and
storing the received messages in a message store of the first data center.

15. The method recited in claim 9, further comprising, by a cross-data-center component of the first data center:
receiving a subscription request with respect to a second one of the topics from a second one of the data centers;
retrieving all messages belonging to the second topic that have been published by one or more users connected with the first data center and have not been delivered to the second data center from a message store of the first data center based on the information stored in the metadata store; and
transmitting the retrieved messages to the second data centers.

16. The method recited in claim 9, further comprising, by the first message processor, assigning one or more of the topics the first message processor is currently responsible for to one or more other ones of the message processors.

17. One or more computer-readable tangible storage media embodying software operable, when executed by a first one of a plurality of message processors of a first one of a plurality of data centers of a publish/subscribe system, to:
receive a request with respect to a first one of the topics from a client device associated with a user and connected with the first message processor;
determine whether the first message processor itself is currently responsible for the first topic;
if the first message processor itself is currently responsible for the first topic, then service the request; and
if the first message processor itself is not currently responsible for the first topic, then:
determine whether any of other ones of the message processors is currently responsible for the first topic based on information concerning the first data center stored in a metadata store of the first data center
if a second one of the message processors is currently responsible for the first topic, then redirect the request to the second message processor to be serviced; and if none of the other ones of the message processors is currently responsible for the first topic, then:
select one of the message processors to be responsible for the first topic;
if the selected one of the message processors is the first message processor, then service the request; and
if the selected one of the message processors is not the first message processor, then redirect the request to the selected one of the message processors to be serviced.

18. The media recited in claim 17, wherein:
each one of the message processors is responsible for one or more of the topics; and
each one of the topics is assigned to one of the message processors at any given time.

19. The media recited in claim 17, wherein:
the request is a publication request, wherein the user desires to publish a message to the first topic; and
to service the publication request comprises:
associate an identifier of the first data center and a value of a message counter to the message;
increment the value of the message counter;
store the message in a message store of the first data center; and
update the information stored in the metadata store with respect to the message.

20. The media recited in claim 17, wherein:
the request is a subscription request, wherein the user desires to receive messages published to the first topic; and
to service the subscription request comprises:
subscribe to the first topic from one or more second ones of the data centers through a cross-data-center component of the first data center;
retrieve all messages belonging to the first topic that have not been delivered to the user from a message store of the first data center based on the information stored in the metadata store; and
deliver the retrieved messages to the client device associated with the user.

21. The media recited in claim 17, wherein to select one of the message processors to be responsible for the first topic comprises:
determine a workload of each one of the message processors based on the information stored in the metadata store; and
select the one message processor that has the least workload to be responsible for the first topic.

22. The media recited in claim 17, wherein the software is further operable when executed by a cross-data-center component of the first data center to
transmit a subscription request with respect to the first topic to each one of one or more second ones of the data centers:
receive one or more messages belonging to the first topic from each one of the second data centers; and
store the received messages in a message store of the first data center.

23. The media recited in claim 17, wherein the software is further operable when executed by a cross-data-center component of the first data center to:
receive a subscription request with respect to a second one of the topics from a second one of the data centers;
retrieve all messages belonging to the second topic that have been published by one or more users connected with the first data center and have not been delivered to the second data center from a message store of the first data center based on the information stored in the metadata store; and
transmit the retrieved messages to the second data centers.

24. The media recited in claim 17, wherein the software is further operable when executed by the first message processor to assign one or more of the topics the first message processor is currently responsible for to one or more other ones of the message processors.

* * * * *